(12) United States Patent
Neal et al.

(10) Patent No.: US 7,505,260 B2  
(45) Date of Patent: Mar. 17, 2009

(54) STORAGE COMPARTMENT WITH POSITIONABLE POST FOR HOLDING A COMPACT DISC AND RELATED SYSTEM AND METHOD

(75) Inventors: Thomas S. Neal, Cupertino, CA (US); Sze-Moey Voon, Cupertino, CA (US); Joel Jacobs, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 107 days.

(21) Appl. No.: 10/800,280

(22) Filed: Mar. 12, 2004

(65) Prior Publication Data

US 2005/0201051 A1    Sep. 15, 2005

(51) Int. Cl.  
*H05K 7/00* (2006.01)

(52) U.S. Cl. ............ 361/685; 312/223.2; 206/310

(58) Field of Classification Search ......... 361/685, 361/683; 248/218.4; 292/32, 42, 64, 67, 292/137, 145, 150, 162, 292, 295, 302, DIG. 51, 292/DIG. 63; 211/41.12; 206/308.3, 310; 312/223.2

See application file for complete search history.

(56) References Cited

U.S. PATENT DOCUMENTS

| | | | | |
|---|---|---|---|---|
| 3,882,473 A | * | 5/1975 | Hoehmann | 360/97.03 |
| 5,400,902 A | * | 3/1995 | Kaminski | 206/310 |
| 5,526,926 A | * | 6/1996 | Deja | 206/308.1 |
| 6,049,452 A | * | 4/2000 | You et al. | 361/685 |
| 6,164,614 A | * | 12/2000 | Lim et al. | 248/634 |
| 6,227,362 B1 | * | 5/2001 | Cheung | 206/308.1 |
| 6,272,104 B1 | * | 8/2001 | Liao et al. | 369/270 |
| 6,377,446 B1 | * | 4/2002 | Liau | 361/683 |
| 6,382,415 B1 | * | 5/2002 | Cha | 206/310 |
| 6,407,910 B1 | * | 6/2002 | Diaz et al. | 361/683 |
| 6,490,242 B1 | * | 12/2002 | Bonn et al. | 720/738 |
| 6,535,379 B1 | * | 3/2003 | Smeenge et al. | 361/683 |
| 6,732,862 B1 | * | 5/2004 | Hu | 206/310 |
| 6,799,677 B2 | * | 10/2004 | Marsilio et al. | 206/308.1 |
| 6,947,280 B2 | * | 9/2005 | Li | 361/685 |
| 6,951,278 B2 | * | 10/2005 | Pettigrew et al. | 206/308.1 |

* cited by examiner

*Primary Examiner*—Lisa Lea-Edmonds  
*Assistant Examiner*—Ingrid Wright

(57) ABSTRACT

A storage compartment for storing a data storage disc and/or other items includes a side, and a post positionable relative to the side. With the positionable post, one may position the post to extend away from a bottom of the compartment to retain one or more discs in the storage compartment. Or one may recess the post to store other items, such as a camera and camera docking station, in the compartment. Thus, one can move the post out of the way when the compartment does not contain a storage disc, thus freeing up the compartment to better store other items.

21 Claims, 5 Drawing Sheets

STORAGE COMPARTMENT WITH POSITIONABLE POST FOR HOLDING A COMPACT DISC AND RELATED SYSTEM AND METHOD

CROSS-REFERENCED APPLICATIONS

The following U.S. patent applications are herein incorporated by this reference: U.S. Utility patent application Ser. No. 10/800,234 titled STORAGE COMPARTMENT FOR STORING ITEMS, AND RELATED SYSTEMS AND METHODS, filed on 12 Mar. 2004; U.S. Utility patent application Ser. No. 10/800,235 titled HOUSING HAVING A CABLE CONDUIT AND RELATED SYSTEMS AND METHODS, filed on 12 Mar. 2004; U.S. Design Patent Application Ser. No. 29/201,340 titled PORTION OF A HOUSING FOR PROCESSING CIRCUITRY OR OTHER SIMILAR ITEM, filed on 12 Mar. 2004; and U.S. Design Patent Application Ser. No. 29/201,290 titled POWER SWITCH FOR PROCESSING CIRCUITRY OR OTHER SIMILAR ITEM, filed on 12 Mar. 2004.

BACKGROUND

Many computer systems have a processor that receives and generates data and executes instructions, and have one or more storage devices that are coupled to the processor, that read data stored on a removable storage medium, and that write data to the medium. The processor typically includes circuitry, such as a central processing unit, for performing various computing functions, such as executing programs to perform specific tasks, and the computer system typically includes a housing to protect the processor, the storage devices, and other components of the computer system. In addition to its protection function, the housing may include a storage region to store removable storage media when the media are not being used.

For example, FIG. 1 shows a computer system 10 that includes a housing 12. The housing 12 includes a storage compartment 14 to store a storage medium 16 such as, e.g., a compact disc or a dvd. The storage compartment 14 includes a shaft 18 to hold the compact disc 16 in an interior 20 that is formed by four side walls 22 and a bottom side 24. The shaft 18 is fixed to the bottom 24, and thus, may not be positioned relative to the bottom 24 in other positions. When storing the compact disc 16 in the compartment 14, one first aligns the hole 26 in the disc 16 with the shaft 18, and then guides the disc toward the bottom 24 such that the shaft 18 engages the hole 26.

Unfortunately, storing other types of removable storage media, such as a magnetic disc and magnetic tape, or storing other items, such as a camera or camera docking station, in the storage compartment 14 can be difficult. Because the shaft 18 is not positionable relative to the bottom side 24, one has to place the disc or camera between a sidewall 22 and the shaft to store the item in the storage compartment 14. Because the distance between the shaft 18 and a sidewall 22 is approximately the radius of the compact disc 16, a typical magnetic disc, camera, or camera docking station may not fit well in the storage compartment 14. Thus, the storage compartment 14 does not easily and securely store items or removable storage media other than a compact disc or dvd.

SUMMARY

In one aspect of the invention, a storage compartment for storing a compact disc, and/or other items, includes a side, and a post positionable relative to the side. With the positionable post, one may position the post to extend away from the side to retain one or more compact discs in the storage compartment; or one may re-position the post to store other items, such as a camera docking station, in the compartment. Thus, in addition to storing a compact disc in the compartment, one can also more easily and more securely store other items in the storage compartment.

DETAILED DESCRIPTION

Figure 1:
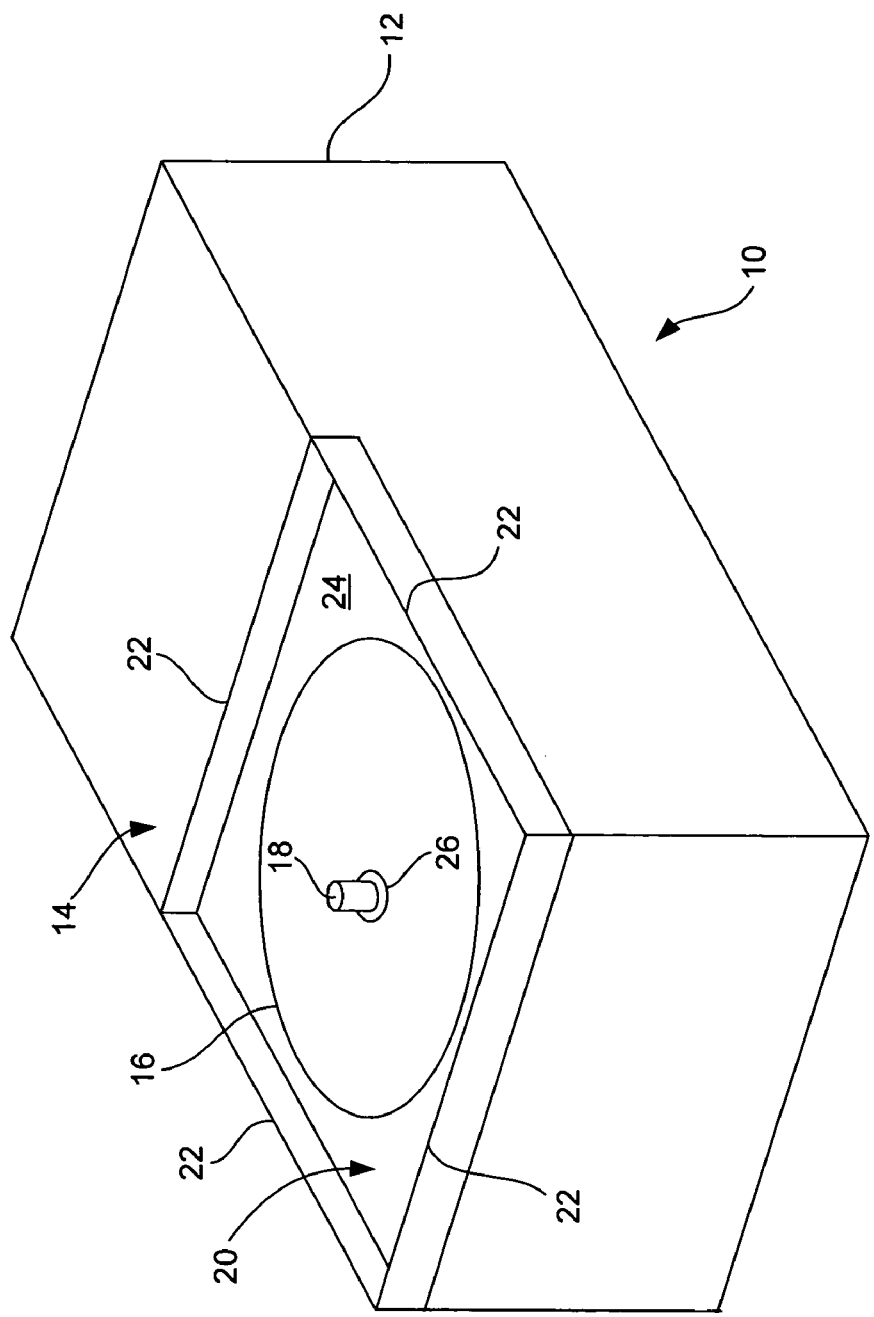
FIG. 1 is a perspective view of a conventional storage compartment that includes a fixed shaft for engaging the center hole of a storage medium such as a compact disc or dvd.
Figure 2:
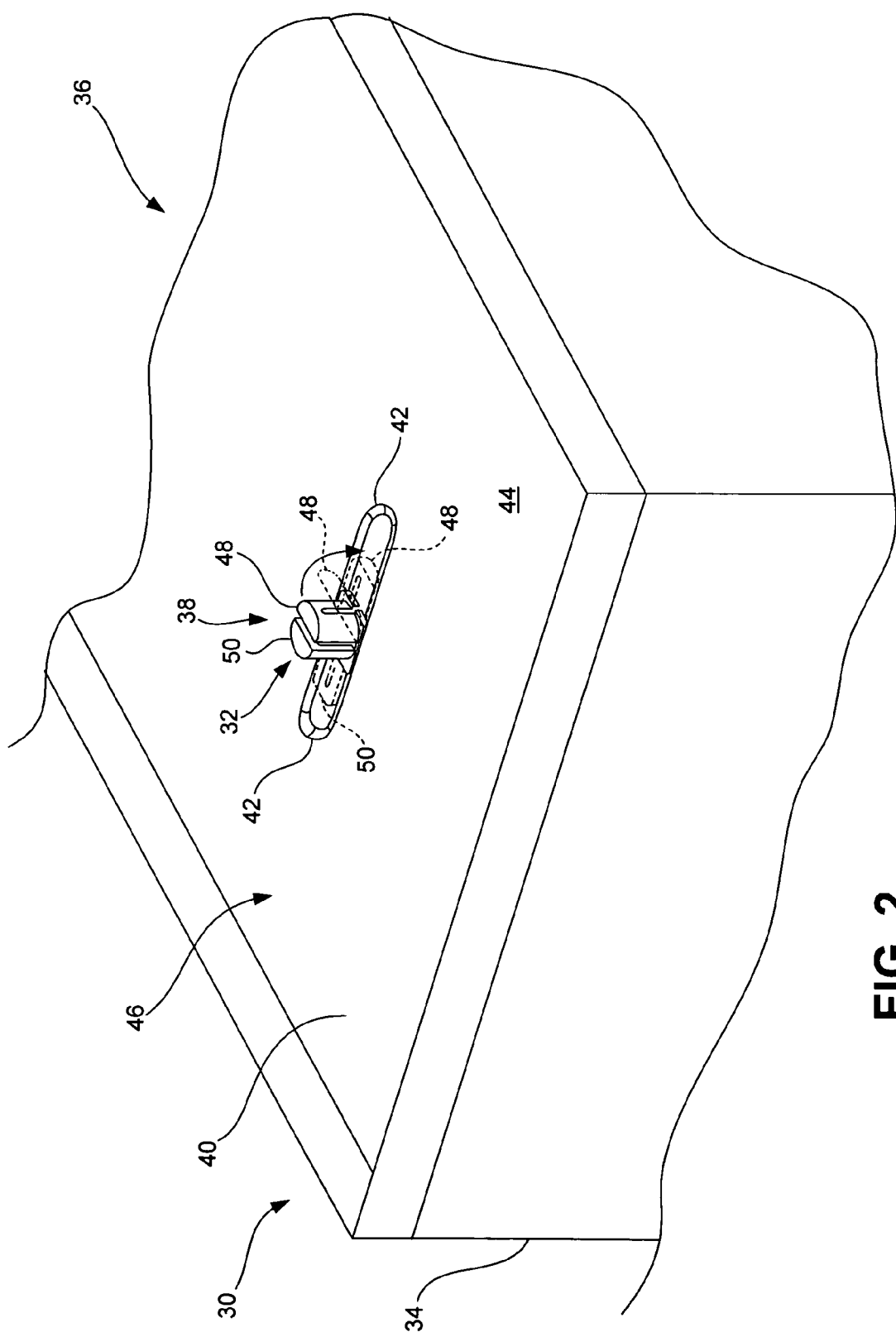
FIG. 2 is a perspective view of a storage compartment that includes a positionable post according to an embodiment of the invention.

FIG. 2 is a perspective view of a storage compartment 30 that includes a positionable post 32 according to an embodiment of the invention. The storage compartment 30 may be incorporated into a housing 34 of a computer system 36 as shown, or the storage compartment may be separate from the computer system. The post 32 includes a body 38 to hold one or more storage media (omitted for clarity but shown in FIG. 5) and a coupling element (not shown in FIG. 2 but discussed in greater detail in conjunction with FIG. 4). The coupling element couples the body 38 with a side 40 (here, the bottom) of the storage compartment 30 and allows the body 38 to be positioned relative to the side 40 in at least two different positions. In one of the positions, the post 32 may be used to retain one or more circular storage media in the storage compartment 30. In another position, the post 32 may be positioned to allow the storage compartment to store other items, for example a camera docking station (omitted for clarity but shown in FIG. 3), or other types of removable storage media such as a magnetic disc or tape. Thus, with the positionable post 32, one can store storage media, and can also more easily and more securely store other items, as compared to the storage compartment 20 of FIG. 1.

Other embodiments of the storage compartment 30 are contemplated. For example, the positionable post 32 may be coupled to a sidewall 22 and positionable relative to the sidewall. In another example, the storage compartment 30 may include a top or lid, and the post 32 may be coupled to it.

Still referring to FIG. 2, the post 32 may include a locking element (not shown in FIG. 2 but discussed in greater detail in conjunction with FIG. 4) for retaining the body 38 at one or more positions where the body is angled relative to the bottom 40. For example, the locking element may retain the body 38 at two different angular positions. The first position may be where the body 38 is substantially perpendicular to the bottom 40. In the first position, the post 32 may be used to retain one or more storage media. The second position may be where the body 38 is substantially parallel to the side 40 and disposed in a receptacle 42 below a surface 44 of the bottom 40. In this second position, the post 32 does not extend past the surface 44 into an interior 46 of the storage compartment 30, and thus, allows one to store items other than a compact disc in the compartment. Alternatively, the locking element may retain the body 38 at more than two angular positions relative to the bottom 40.

Other embodiments are contemplated. For example, the second position may include the body 38 remaining substantially perpendicular to the bottom 40 while disposed below the surface 44 of the bottom 40. In another example, the second position may include the body disposed in a receptacle of the sidewall 22.

Still referring to FIG. 2, in one embodiment, the body 38 includes a first component 48 and a second component 50 that each may be positioned independently of each other. This may be desirable to reduce the depth of the receptacle 42. The coupling element may include a first coupling section (not shown in FIG. 2 but discussed in greater detail in conjunction with FIG. 4) to couple the first component 48 to the bottom 40 and to allow the first component 48 to be positioned relative to the bottom 40 in at least two different positions. The coupling element may also include a second coupling section (not shown in FIG. 2 but discussed in greater detail in conjunction with FIG. 4) to couple the second component 50 to the bottom 40, and to allow the second component 50 to be positioned relative to the bottom in at least two different positions.

Other embodiments are contemplated. For example, the body 38 may include more or fewer than two components 48 and 50. In another example, the body may be shaped differently. For example, the body may be triangular or rectangular shaped.

In operation, one may position the post 32 relative to the bottom 40 as desired to store one or more storage media, or other items in the storage compartment 30. For example, in one embodiment, one may position the body 38 in a first position to store one or more compact discs by pivoting the first and second components 48 and 50, respectively, to extend perpendicular to the bottom 40. Then, one may place the center holes of the compact discs over the post 32 formed by the first and second components 48 and 50. To store an item other than a storage disc, one may position the body 38 in a second position by pivoting the first and second components 48 and 50, respectively, into the receptacle 42 below the surface 44 of the bottom 40. Then, one may place the item in the storage compartment 30 unimpeded by the post 32.

Figure 3:
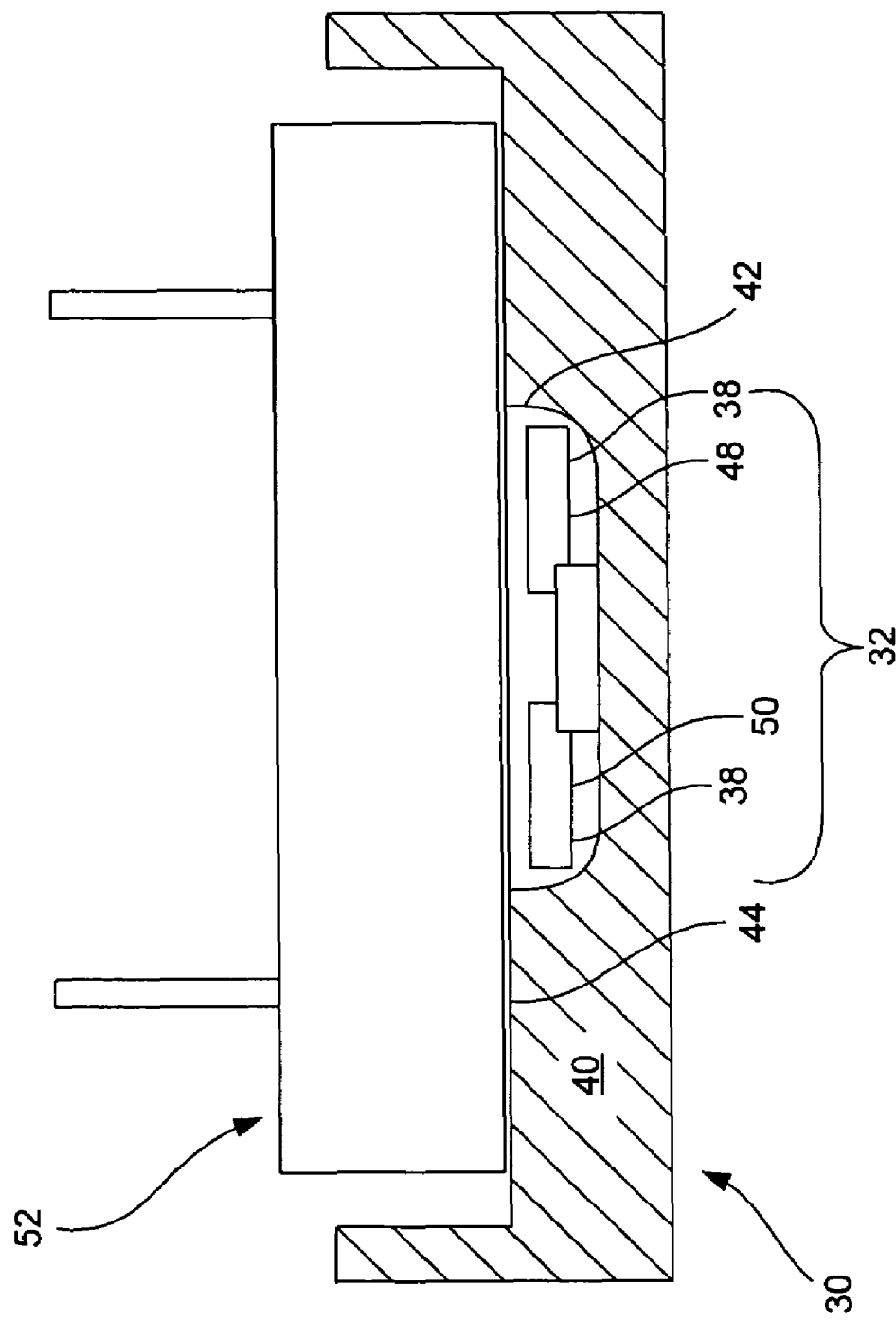
FIG. 3 is a cross-sectional view of the storage compartment in FIG. 2 with the post positioned to place a camera docking station in the compartment according to an embodiment of the invention.

FIG. 3 is a cross-sectional view of the storage compartment 30 in FIG. 2 with the post 32 positioned to store a camera docking station 52 in the compartment 30 according to an embodiment of the invention.

The body 38 may be disposed in the storage compartment 30 in any desired manner that frees the interior 46 to store items other than storage discs. For example, in one embodiment, the first and second components 48 and 50, respectively, of the body 38 may be disposed in the receptacle 42 and may lie below and substantially parallel to the surface 44. Thus, when the camera docking station 52 is stored in the storage compartment 30, the station can occupy the portion of the surface 44 over the recessed post 32.

Figure 4:
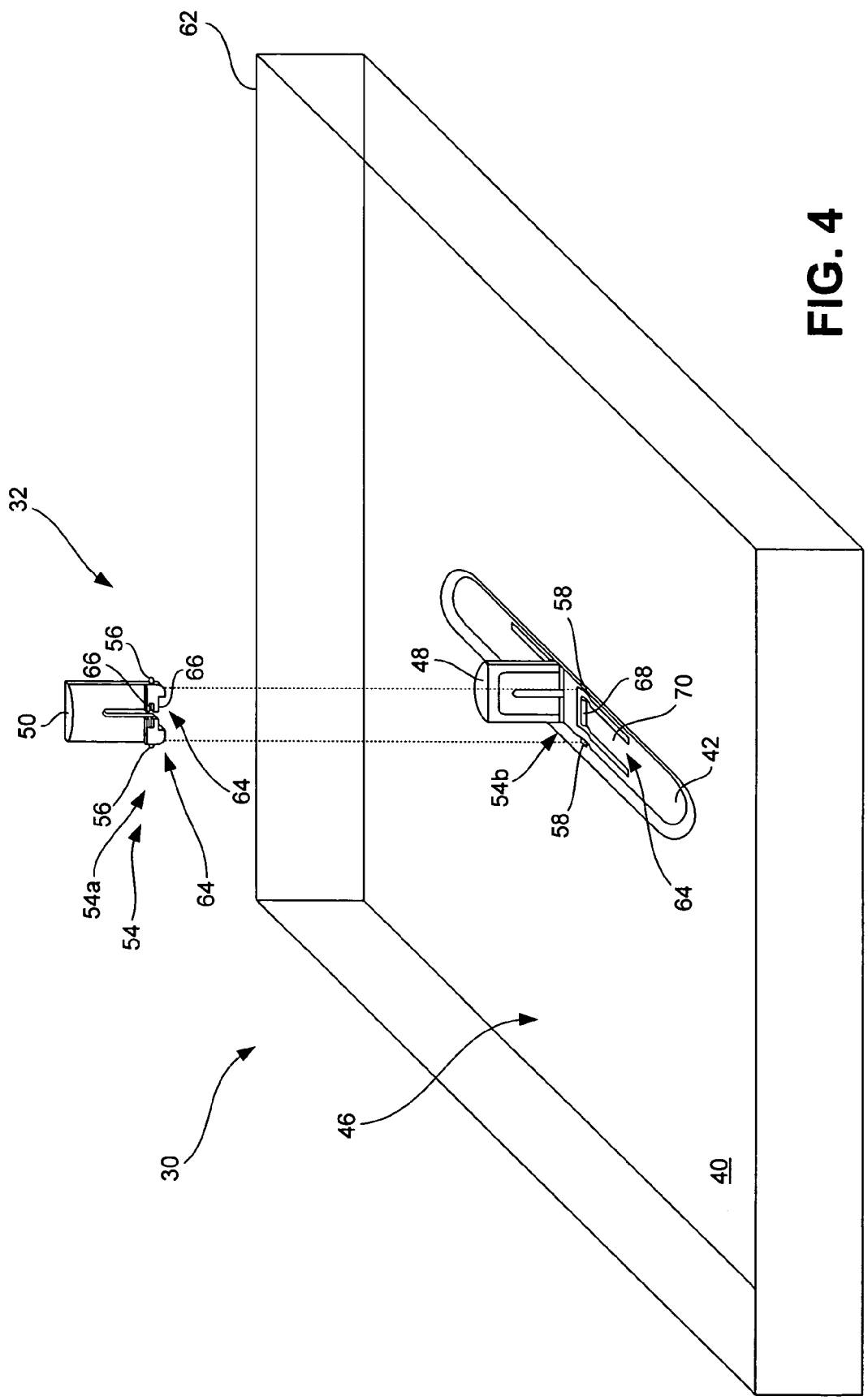
FIG. 4 is an exploded, perspective view of the storage compartment and post in FIG. 2.

FIG. 4 is an exploded perspective view of the storage compartment 30 and post 32 of FIGS. 2 and 3, according to an embodiment of the invention. The first component 48 of the body 38 is shown coupled to the bottom 40, and the second component 50 of the body is shown separated from the bottom. Each component 48 and 50 may be similarly coupled to the bottom 40 as discussed below. Alternatively, each component 48 and 50 may be coupled differently to the bottom 40, for example, the first component may be pivotally fastened and the second component may be slidably fastened.

The post 32 includes a coupling element 54 (not referenced on the first component 48 for clarity) to couple the body 38 to the bottom 40 of the storage compartment 30 and to allow the body to be positioned relative to the bottom in at least two different positions. The coupling element 54 may releasably fasten the body 38 to the bottom 40. This may be desirable to replace the body 38 or one of the components 48 and 50 with a body or component that includes a different size and/or shape. For example, the replacement body or component may be longer than the respective body 38 or components 48 and 50, and thus, able to retain more storage media.

In one embodiment, the coupling element 54 may include a protrusion 56 (not shown on the first component 48 for clarity) that may be inserted into a hole 58 in the receptacle 42, and may include a first element (not referenced on the first component 48 for clarity) to couple the first component 48 to the bottom 40, and a second element 54a to couple the second component 50 to the bottom 40. The bottom 40 may include the receptacle 42 and four holes 58 (only two shown for clarity), and the first and second components 48 and 50, respectively, each may include two protrusions 56. Each protrusion 56 may be inserted into a respective hole 58 to couple the first and second components 48 and 50, respectively, to the bottom 40. To insert each protrusion 56 into a respective hole 58, the two protrusions 56 of each component 48 and 50 may be forced toward each other to align them with their respective holes 58, and then once aligned, released. With the protrusions 56 inserted into their respective holes 58, the first and second components 48 and 50, respectively, may be pivoted relative to the bottom 40 among different positions while remaining fastened to the bottom 40.

Other embodiments are contemplated. For example, the coupling element 54 may include a hinge fastened to the first component 48 and the bottom 40, and another hinge fastened to the second component 50 and the bottom 40. In another example, each component 48 and 50 may be slidable relative to the bottom 40 among different positions. For example, one or both components 48 and 50 may be oriented substantially perpendicular to the bottom 40 and remain substantially perpendicular to the bottom 40 as each is retracted below or extended above the surface 44. For example, the bottom 40 may include four tracks, and each protrusion 56 of the components 48 and 50 may be inserted into a respective one of the tracks and slide in their respective track when each component is extended or retracted.

Still referring to FIG. 4, the post 32 may also include a locking element 64 (not shown on the first component 48 for clarity) to retain the body 38 at one or more positions. In one embodiment, the locking element 64 includes a locking-element receptacle 66, and a locking-element protrusion 68 that may engage the locking-element receptacle 66 when the body 38 is in a desired position. For example, the first and second components 48 and 50, respectively, each may include two locking-element receptacles 66 (not shown on the first component 48 for clarity), and the bottom 40 may include two locking-element protrusions 68 (only one shown for clarity), each corresponding to a respective one of the components 48 and 50. With each of the components 48 and 50 coupled to the bottom 40, each locking-element receptacle 66 may be aligned with a respective one of the locking-element protrusions 68 by pivoting the components 48 and 50 to a predetermined position. When a locking-element receptacle 66 is aligned with a protrusion 68, a cantilevered beam 70 urges the protrusion 68 toward the receptacle 66. With both locking-element protrusions 68 inserted into a locking-element receptacle 66, the locking element 64 retains the body 38 in the predetermined position. For example, one predetermined position may be when the components 48 and 50 are perpendicular to the bottom 40 and another predetermined position may be when the components 48 and 50 are in the receptacle 42 and parallel to the bottom 40.

Other embodiments are contemplated. For example, the locking element 64 may include a setscrew to retain the body 38 at one or more predetermined positions. In another example, the locking element may include a bar that extends from the body 38 and is insertable into a hole in the bottom 40, whose location is predetermined.

Still referring to FIG. 4, the storage compartment 30 and post 32 may be made of any desired material. For example, in one embodiment the storage compartment 30 and post 32 are formed by casting conventional plastic in a mold.

Figure 5:
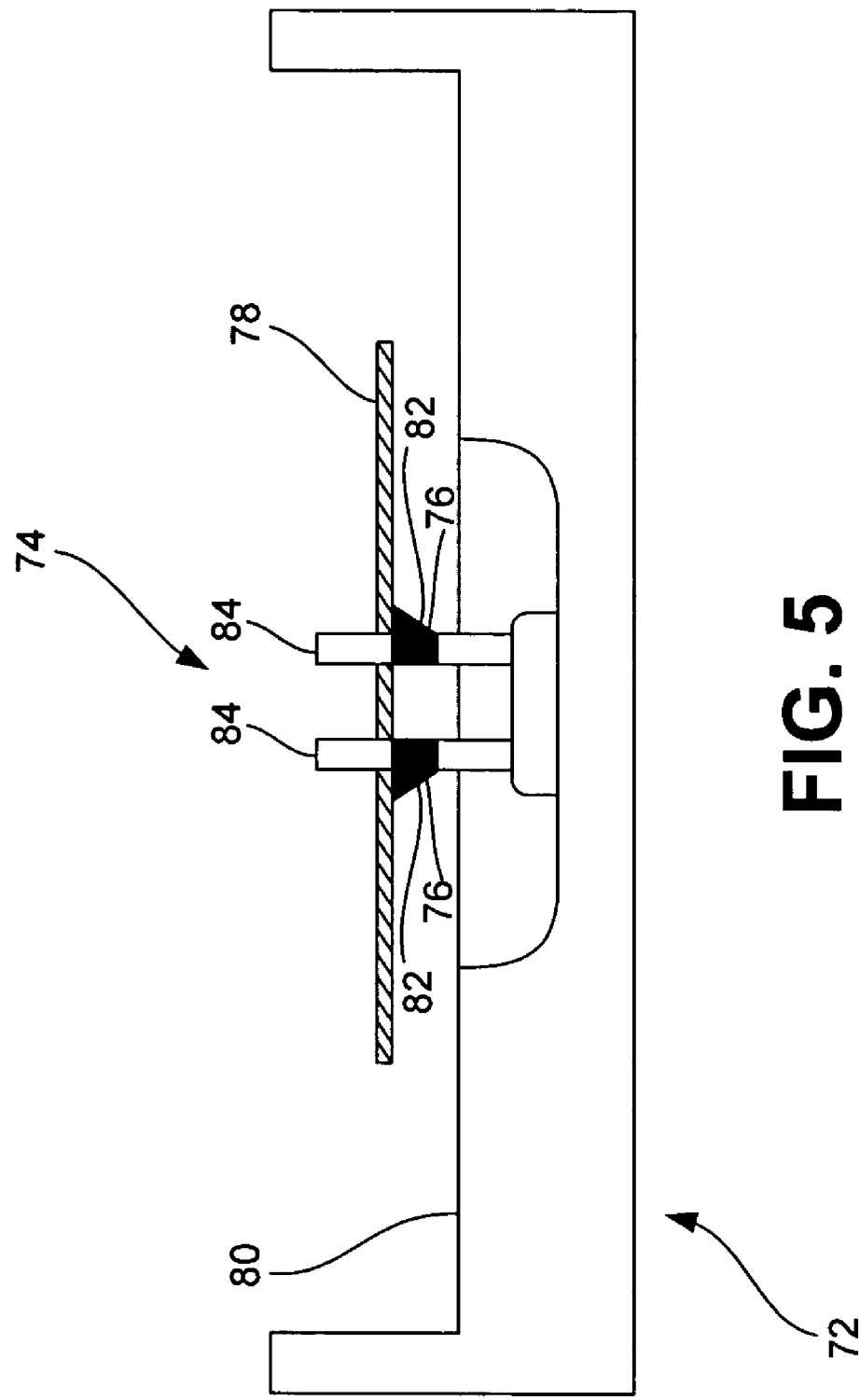
FIG. 5 is a cross-sectional view of a storage compartment that includes a positionable post according to another embodiment of the invention.

FIG. 5 is a cross-sectional view of a storage compartment 72 that includes a positionable post 74 according to another embodiment of the invention. The post 74 is similar to the post 32 in FIGS. 2-4, except that the post 74 includes a support element 76 to support a storage disc 78 away from the bottom 80. For example, in one embodiment the support element 76 includes a shoulder 82 that may be fastened to the components 84 using any conventional technique, or may be formed integral with the components 84 and 86. It may also be desirable to make the shoulder 82 adjustable so that one can adjust the distance between the bottom 80 and the shoulder 82.

The preceding discussion is presented to enable one skilled in the art to make and use the invention. Various modifications to the disclosed embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

What is claimed is:

1. A post for retaining an item in a storage compartment having a side, the post comprising: a body operable to hold the item; and a coupling element operable to couple the body to the side of the storage compartment and to allow the post to be moved to a position in which the body can receive the item to be stored in the compartment, and to a different position in which the body can not receive the item to be stored in the compartment; wherein the coupling element includes a locking element operable to retain the body in at least one of the positions.

2. The post of claim 1 wherein the body is releasably fastened to the side of the storage compartment.

3. The post of claim 1 wherein the body is pivotable relative to the side of the storage compartment.

4. The post of claim 1 wherein the position in which the body receives an item stored in the compartment includes the body substantially perpendicular to the side, and the position in which the body does not receive an item stored in the compartment includes the body substantially parallel with the side.

5. The post of claim 1 wherein the coupling element includes a protrusion insertable into a hole.

6. The post of claim 1 wherein the coupling element includes a protrusion extending from the body, and a hole in the side of the storage compartment operable to receive the protrusion.

7. The post of claim 1 wherein the item to be stored in the storage compartment includes a storage disc having a hole, and the body is insertable into the hole.

8. The post of claim 1 wherein the item to be stored in the storage compartment includes a storage disc having a hole, and the body is insertable into the hole, and includes a shoulder to support the storage disc away from the side.

9. The post of claim 1 wherein:
the body includes a first component and a second component, and
the coupling element includes:
a first element operable to couple the first component to the side of the storage compartment and to allow the first component to be positioned relative to the side in at least two different positions, and
a second element operable to couple the second component to the side of the storage compartment and to allow the second component to be positioned relative to the side in at least two different positions.

10. A storage compartment comprising:
a bottom and a sidewall that define an interior; and
a post operable to retain a storage disc in said interior, and including, a body operable to engage the storage disc; and a coupling element operable and to allow the body to be positioned relative to the bottom in at least two different positions that include a first position in which the body can receive the storage disc when the disc is stored in the compartment, and a second position in which the body can not receive the storage disc, wherein said coupling element comprises a hinge that allows said body to rotate at a base of the body between said first position in which said body is extending from said bottom of the storage compartment and said second position in which said body lays below said bottom of the storage compartment in a receptacle when the disc is stored in the compartment and in which the body remains without one exerting pressure on the body.

11. The storage compartment of claim 10 wherein the coupling element includes a locking element operable to retain the body in at least one of the positions in one position the body extends from the bottom into the interior substantially perpendicular to the bottom.

12. The storage compartment of claim 10 wherein said body is divided into two portions each of which rotate in opposite directions into said receptacle in.

13. The storage compartment of claim 10 wherein said hinge comprises protrusions at said base of the body that mate with holes in said receptacle.

14. A method for storing a storage disc, the method comprising:
rotating a body of a post around a hinge attached to said post, wherein said body of said post is rotated between an extended position extending from a side of a storage compartment and a retracted, from a position in which the body is disposed in a receptacle in said side of the storage compartment and can not receive the storage disc and, when said body of said post is in said extended position, engaging a hole in the disc with the body.

15. The method of claim 14 further comprising retaining the body in at least one position with a locking element.

16. The method of claim 14 further comprising supporting the disc away from the side with a support element on said body of said post.

17. The method of claim 14 further comprising: positioning the body in the retracted relative to the side, to the position in which the body can not receive the disc; and
placing another item in the storage compartment.

18. The method of claim 14 wherein said body comprises two separate members, the method further comprising positioning the two separate members of the body adjacent to each other, such that both are received through the hole in the disc when engaging the disc with the body relative to the side includes pivoting the post relative to the side.

19. The method of claim 18, wherein rotating the body of the post into the extended position further comprises rotating the two separate member of the body in different directions, away from each other to place both in said positioning the body relative to the side includes disposing the receptacle.

20. A post for retaining an item in a storage compartment having a side, the post comprising: a body operable to hold the item; and a coupling element operable to couple the body to the side of the storage compartment and to allow the body to be positioned relative to the side in at least two different positions, the coupling element including a locking element operable to retain the body in at least one of the positions.

21. A storage compartment comprising: a bottom and a sidewall that define an interior; and a post pivotable and operable to retain a storage disc, and including, a body operable to engage the storage disc; and a coupling element operable to couple the body to the bottom of the storage compartment and to allow the body to be positioned relative to the bottom in at least two different positions, wherein in one position the body is disposed in a receptacle of the bottom, below a surface of the bottom.

* * * * *

UNITED STATES PATENT AND TRADEMARK OFFICE
CERTIFICATE OF CORRECTION

PATENT NO. : 7,505,260 B2  
APPLICATION NO. : 10/800280  
DATED : March 17, 2009  
INVENTOR(S) : Thomas S. Neal et al.

Page 1 of 1

It is certified that error appears in the above-identified patent and that said Letters Patent is hereby corrected as shown below:

In column 6, line 21, in Claim 10, after "operable" delete "and".

In column 6, lines 32-34, in Claim 10, after "receptacle" delete "when the disc is stored in the compartment and in which the body remains without one exerting pressure on the body".

In column 6, lines 37-39, in Claim 11, after "positions" delete "in one position the body extends from the bottom into the interior substantially perpendicular to the bottom".

In column 6, line 42, in Claim 12, after "receptacle" delete "in".

In column 6, line 51, in Claim 14, delete "retracted, from a" and insert -- retracted --, therefor.

In column 6, line 54, in Claim 14, delete "disc" and insert -- disc; --, therefor.

In column 6, line 62, in Claim 17, after "retracted" delete "relative to the side, to the".

In column 7, lines 2-3, in Claim 18, after "body" delete "relative to the side includes pivoting the post relative to the side".

In column 7, lines 7-8, in Claim 19, after "said" delete "positioning the body relative to the side includes disposing the".

Signed and Sealed this

Fourth Day of August, 2009

JOHN DOLL  
*Acting Director of the United States Patent and Trademark Office*